United States Patent
Holverson

(10) Patent No.: US 11,046,175 B2
(45) Date of Patent: Jun. 29, 2021

(54) FUELING SYSTEM

(71) Applicant: Monroe Truck Equipment, Inc., Monroe, WI (US)

(72) Inventor: Andrew Holverson, Monroe, WI (US)

(73) Assignee: MONROE TRUCK EQUIPMENT, INC., Monroe, WI (US)

( * ) Notice: Subject to any disclaimer, the term of this patent is extended or adjusted under 35 U.S.C. 154(b) by 148 days.

(21) Appl. No.: 16/192,907

(22) Filed: Nov. 16, 2018

(65) Prior Publication Data

US 2019/0143810 A1 May 16, 2019

Related U.S. Application Data

(60) Provisional application No. 62/587,154, filed on Nov. 16, 2017.

(51) Int. Cl.
*B60K 15/077* (2006.01)
*B60K 15/01* (2006.01)
*B60K 15/03* (2006.01)

(52) U.S. Cl.
CPC ............ *B60K 15/077* (2013.01); *B60K 15/01* (2013.01); *B60K 2015/03138* (2013.01); *B60K 2015/03144* (2013.01); *B60K 2015/03243* (2013.01)

(58) Field of Classification Search
CPC ...... B60K 15/077; B60K 15/06; B60K 15/01; B60K 2015/03144
See application file for complete search history.

(56) References Cited

U.S. PATENT DOCUMENTS

| | | | | |
|---|---|---|---|---|
| 4,280,721 A | * | 7/1981 | Narkon | F16L 41/007 285/179 |
| 5,168,891 A | * | 12/1992 | Green et al. | B60K 15/077 137/114 |
| 5,806,502 A | * | 9/1998 | Thomas et al. | F02M 31/10 123/557 |
| 6,123,511 A | * | 9/2000 | Sertier | B60K 15/077 123/509 |
| 7,073,751 B1 | * | 7/2006 | Tighe etal | B64D 37/00 244/135 C |
| 2005/0178853 A1 | * | 8/2005 | Doble et al. | F02M 37/106 239/302 |
| 2009/0184205 A1 | * | 7/2009 | Matheny | B64D 39/00 244/135 A |

OTHER PUBLICATIONS

Fuel Transfer Systems. http://fueltool.com/trucksvans/. (viewed and downloaded, Aug. 23, 2019).

\* cited by examiner

*Primary Examiner* — Kevin L Lee
(74) *Attorney, Agent, or Firm* — Quarles & Brady LLP

(57) ABSTRACT

A fueling system is disclosed for use with a service vehicle with a fuel tank and a main engine, and an auxiliary system. A fuel distribution system can include at least one fuel pump and at least one fuel nozzle. A compound fuel extractor can be configured to engage the main fuel tank of the service vehicle to provide first and second overlapping flow paths out of the main fuel tank. The first overlapping flow path can direct fuel from the main fuel tank to the main engine, and the second overlapping flow path can direct fuel from the main fuel tank to the auxiliary system.

21 Claims, 5 Drawing Sheets

FUELING SYSTEM

CROSS REFERENCE TO RELATED APPLICATIONS

This application claims the benefit of U.S. Provisional Patent Application No. 62/587,154 filed on Nov. 16, 2017, the entire contents of which are incorporated herein by reference.

BACKGROUND

In many applications, it may be useful to provide systems for moving fuel from one receptacle (e.g., a first tank) to another (e.g., a second tank). In some applications, a main fuel tank for a vehicle may provide a relatively convenient source of fuel for powering other systems, and thus can be usefully employed in combination with a fueling (e.g., fuel transfer) system.

SUMMARY

Some embodiments of the invention provide a fueling system for use with a vehicle, which can allow fuel from a main fuel tank of the vehicle to be provided to a main engine of the vehicle as well as to an auxiliary engine. In some embodiments, the auxiliary engine can be an engine mounted to the vehicle for powering auxiliary systems, including pumps for sprayer (or other) systems. In some embodiments, a compound fuel extractor can be provided, which can utilize a unitary fitting (or fitting assembly) on a fuel tank to provide fuel to the main engine of the vehicle and to an auxiliary engine. In some embodiments, a controllable dispenser and related components can be placed in communication with the compound fuel extractor, in order to control flow of fuel from the fuel tank to the auxiliary engine.

Some embodiments of the invention provide a fueling system for use with a service vehicle with a main fuel tank and a main engine, and an auxiliary system. A fuel distribution system can include at least one fuel pump and at least one fuel nozzle. A compound fuel extractor can be configured to engage the main fuel tank of the service vehicle to provide first and second overlapping flow paths out of the main fuel tank. The first overlapping flow path can direct fuel from the main fuel tank to the main engine, and the second overlapping flow path can direct fuel from the main fuel tank to the auxiliary system.

Some embodiments of the invention provide a method of retrofitting a service vehicle for use with an auxiliary system. A fusible plug can be removed from a main fuel tank of the service vehicle. A compound fuel extractor can be secured to the main fuel tank, the compound fuel extractor being configured to provide first and second overlapping flow paths out of the main fuel tank, the first overlapping flow path directing fuel from the main fuel tank to the main engine, and the second overlapping flow path directing fuel from the main fuel tank to the auxiliary system. The fusible plug can be secured to the compound fuel extractor along the first overlapping flow path.

DETAILED DESCRIPTION

Figure 1:
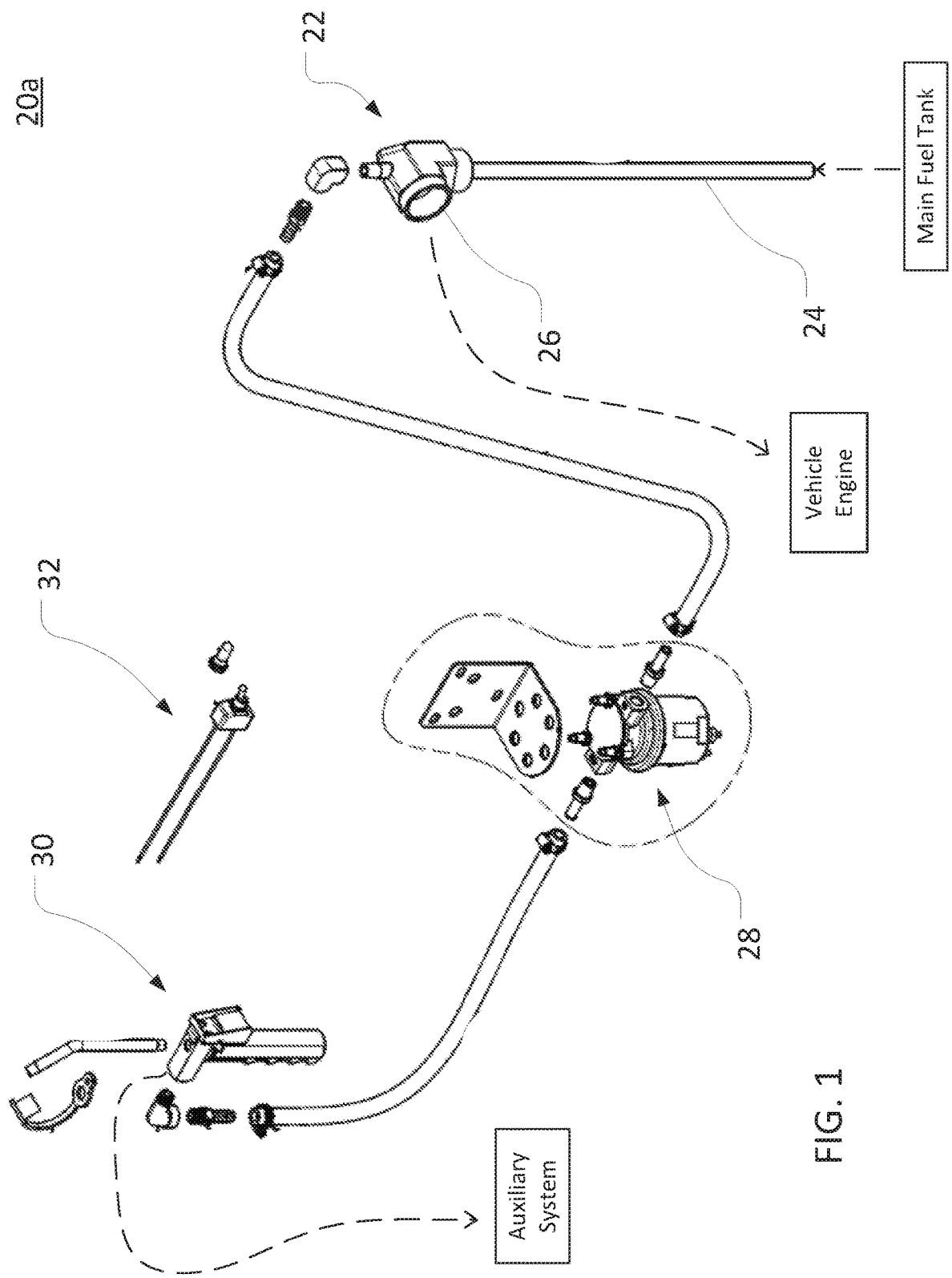
FIG. 1 is an isometric exploded view of a fueling system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless otherwise specified or limited, the phrases "at least one of A, B, and C," "one or more of A, B, and C," and the like, are meant to indicate A, or B, or C (individually or plurally), or any combination of A, B, and/or C (individually or plurally), including one or more instances of A, one or more of instances B, and/or one or more of instances of C.

As noted above, it may be useful to provide fueling systems that can transfer fuel from one receptacle to another. In some embodiments, for example, an auxiliary engine for a service vehicle (e.g., to power an auxiliary pumping system) may be powered by liquid fuel (e.g., gasoline) and a main fuel tank of the service vehicle may provide a convenient source of that fuel for the auxiliary engine. However, as manufactured, fuel systems of certain service vehicles may not include flow systems configured to easily route fuel from a main fuel tank to locations other than the main vehicle engine (e.g., to an auxiliary fuel tank of an auxiliary engine carried by the vehicle). Further, existing approaches to adapting fuel systems for fuel transport to auxiliary systems can be difficult, costly, and otherwise suboptimal.

Embodiments of the invention can address these and other issues. For example, in some embodiments, a fueling system can include a compound fuel extractor that can provide an outlet for fuel to flow from a main fuel tank to a main vehicle engine and to an auxiliary engine carried by the vehicle (or other auxiliary system). In some embodiments, a compound fuel extractor can supplement (e.g., be configured to directly interface or otherwise engage with) certain existing hardware for a fueling system of a vehicle, thereby providing a flow path for an auxiliary engine (or other fuel sink) with relatively little modification of the vehicle's existing components.

In some embodiments, a compound fuel extractor can provide an auxiliary fuel pickup to provide fuel to an auxiliary system. In some embodiments, an auxiliary fuel pickup can extend hermetically through a fitting, and the fitting can hermetically engage a vehicle's main fuel tank to provide a main fuel outlet and an auxiliary fuel outlet for the tank. In some embodiments, the compound fuel extractor can provide a seat for other main fuel system components (e.g., a fusible plug or other safety feature).

FIG. 1 illustrates an example fueling system 20a, according to one embodiment of the invention. In some configurations, the fueling system 20a can be used in conjunction with a service vehicle, in order to distribute fuel from a main fuel tank of the service vehicle (e.g., a fuel tank generally configured to store fuel for use by the main engine of the service vehicle) to one or more auxiliary systems (e.g., an auxiliary engine to power a pumping system that is carried by the service vehicle).

In the embodiment illustrated, the fueling system 20a includes a compound fuel extractor 22, which can be secured to a main fuel tank of a vehicle (not shown), with an auxiliary fuel pickup 24 of the fuel extractor 22 including a hollow tube that extends through an elbow fitting 26 of the fuel extractor 22 into the main fuel tank.

From the fuel extractor 22, flow conduits and associate fittings of various known types can provide a flow path for distribution of fuel from the main fuel tank to an auxiliary system. In the embodiment illustrated, for example, various fittings and flexible hoses provide a flow path from the fuel extractor 22 to a fuel pump 28, and from the fuel pump 28 to a fuel nozzle 30 (and associated hardware and accessories). Accordingly, for example, operation of the fuel pump 28 can draw fuel from the main fuel tank, through the auxiliary fuel pickup 24 for dispersal through the fuel nozzle 30.

In other embodiments, other configurations are possible. For example, in some embodiments, other flow components (e.g., other tubing, piping, fittings, and so on) can provide a flow path from the main fuel tank to an auxiliary fuel sink (e.g., a fuel tank for an auxiliary engine). In some embodiments, other types or numbers of pumps can be included, or one or more pumps can be disposed along a relevant flow path at different locations.

In some embodiments, electronic control of one or more subcomponents of the fueling system 20a can be provided. For example, a manual switch 32 or other control mechanism can be provided to control operation of the fuel pump 28 or other aspects of the fueling system 20a. In FIG. 1, the manual switch 32 is illustrated in an exploded view. It will be recognized that various know techniques can be used to electronically the manual switch 32 to the fuel pump 28 or another relevant component.

Figure 2:
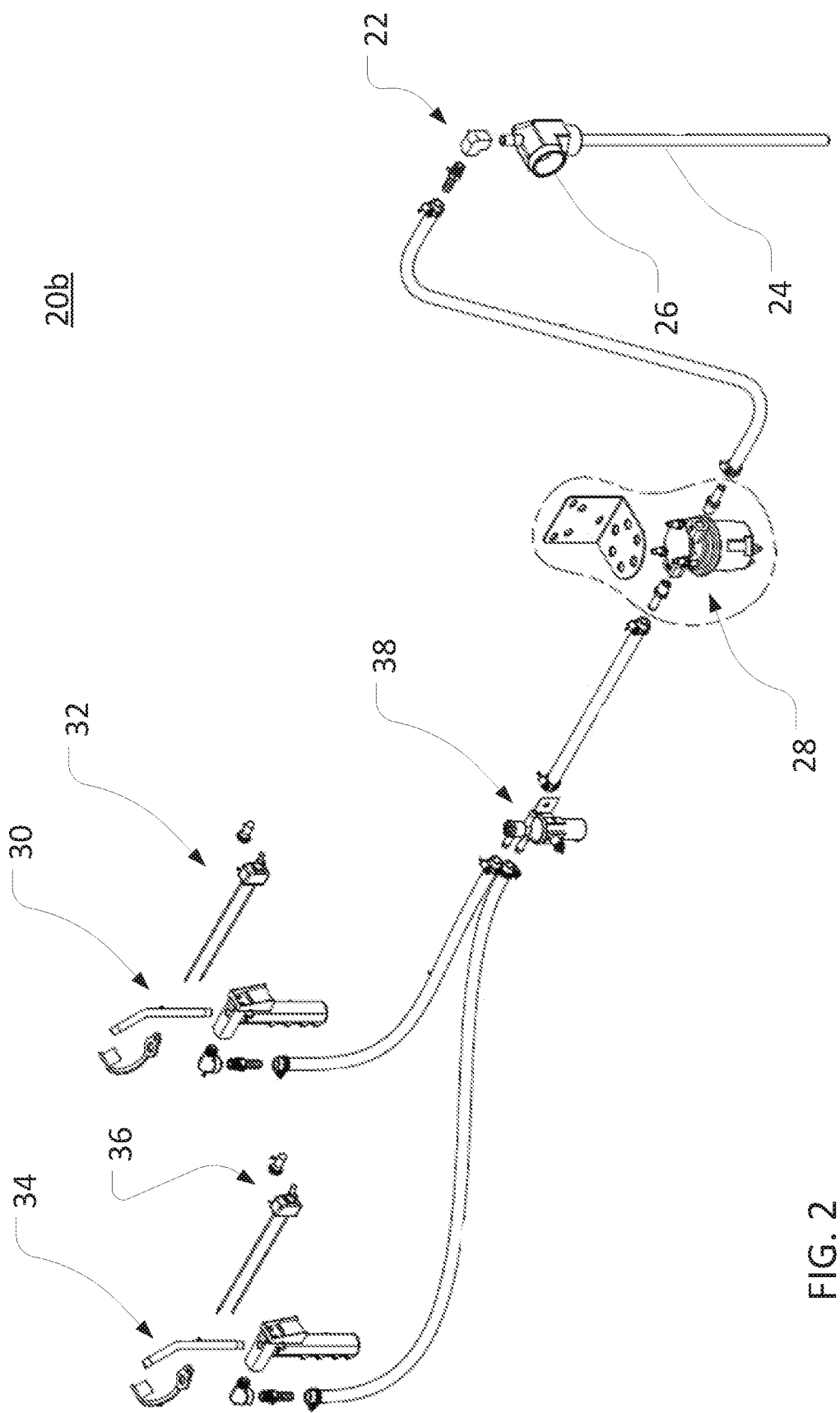
FIG. 2 is an isometric exploded view of another fueling system according to one embodiment of the invention.

FIG. 2 illustrates another example fueling system 20b, which is generally similar to the fueling system 20a. For example, the fueling system 20b can also utilize the compound fuel extractor 22, associated fittings and tubing, the fuel pump 28, and the fuel nozzle 30. Further, in the embodiment illustrated, the fueling system 20b also includes an additional nozzle 34 and associated flow components, as well as an additional manual switch 36, and an electrically controlled fuel selector 38. Thus arranged, for example, the fueling system 20b can allow for fuel from a fuel tank to be transferred, via the compound fuel extractor 22, to multiple auxiliary fuel sinks, such as separate fuel tanks for multiple auxiliary engines (not shown).

Figure 3:
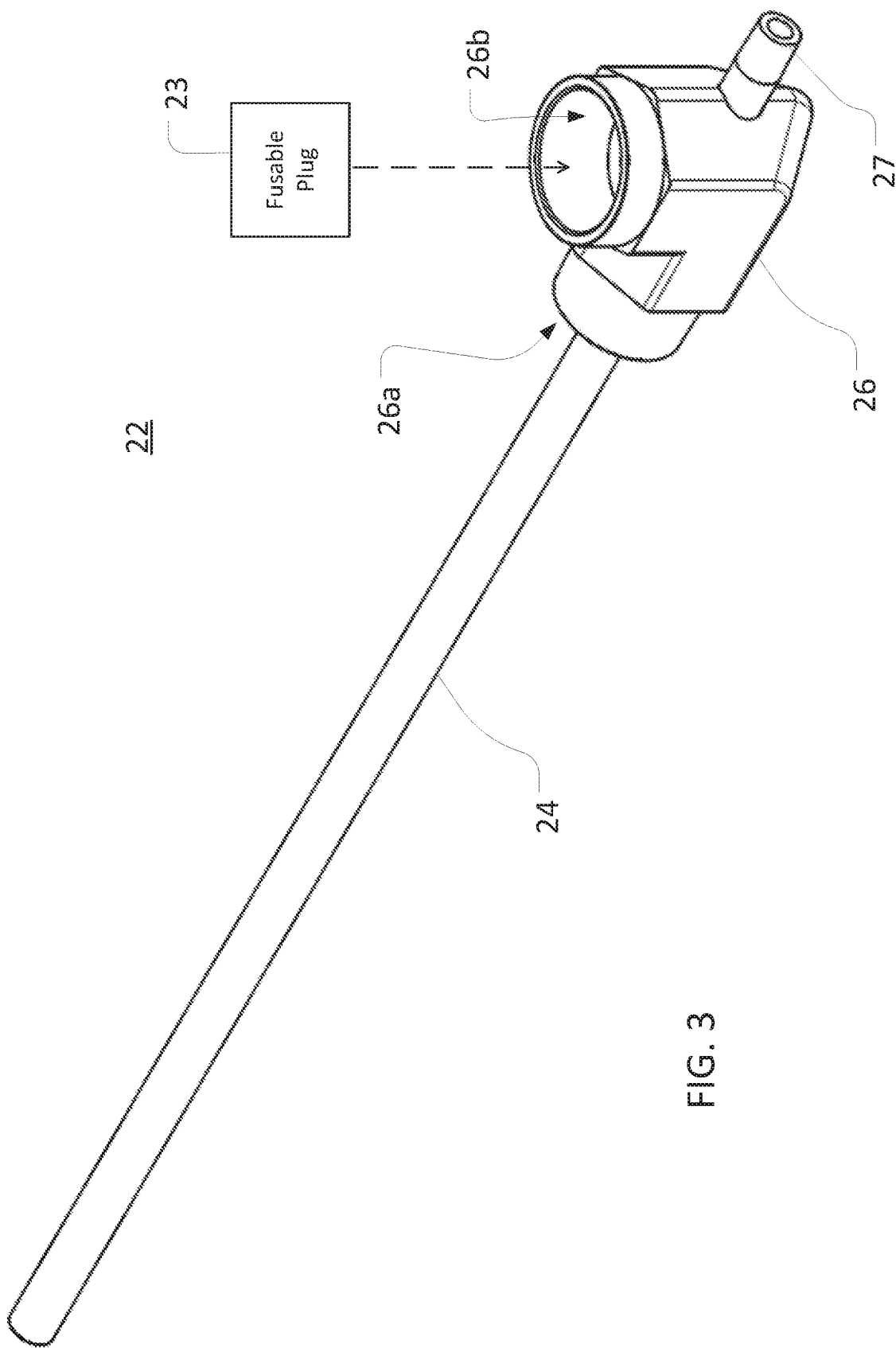
FIG. 3 is an isometric view of a compound fuel extractor for use with the fueling systems of FIGS. 1 and 2.
Figure 4:
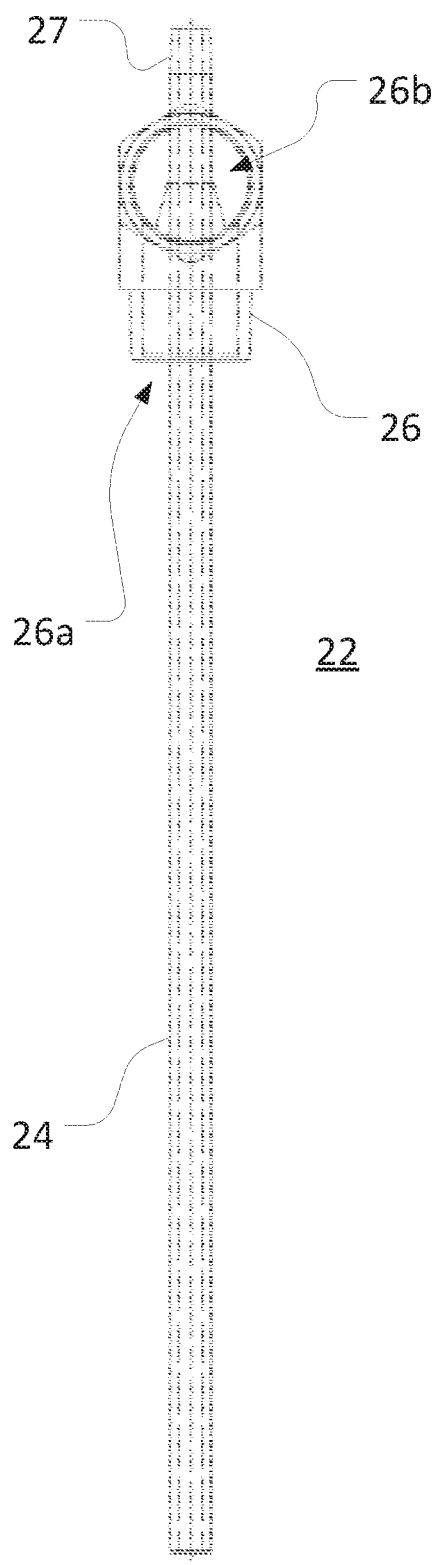
FIG. 4 is a front elevation view of the compound fuel extractor of FIG. 3, rendered transparently to illustrate certain internal features.
Figure 5:
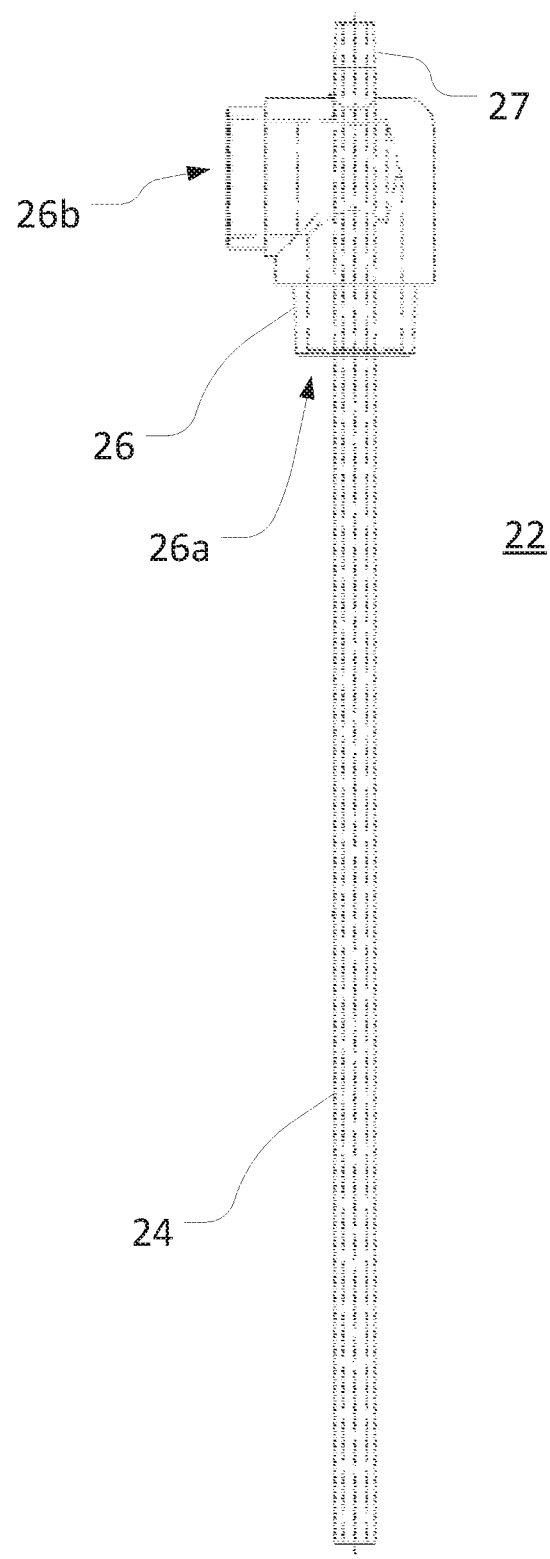
FIG. 5 is a right side elevation view of the compound fuel extractor of FIG. 3, rendered transparently to illustrate certain internal features.

FIGS. 3 through 5 illustrate an example configuration of the compound fuel extractor 22. As noted above, the fuel extractor 22 is generally configured to be secured to a fuel tank of a vehicle, so that fuel can be drawn from the fuel tank through the fuel extractor 22 for distribution.

Usefully, in the embodiment illustrated, the elbow fitting 26 can be configured to be hermetically secured to the main fuel tank at an inlet port, so that fuel from the main fuel tank can generally flow through a main flow path of the elbow fitting 26 to supply a main engine of the vehicle. Further, a main inlet 26a of the elbow fitting 26 can be configured to receive one or more existing (e.g., standard) flow components of a pre-existing vehicle fuel system (not shown), such as a fusible (i.e., meltable) plug or other safety device. In this way, for example, the fuel extractor 22 can be used to retrofit existing vehicle fuel systems without requiring substantial changes to the existing systems, or substantial replacement of components thereof. For example, a fusible plug 23 can be removed from a vehicle fuel tank, the fuel extractor 22 attached in its place, with the auxiliary fuel pickup 24 extending into the gas tank, and the fusible plug then reattached at the main outlet 26b.

As also noted above, in order to provide an auxiliary flow path for fuel to flow from the main fuel tank to an auxiliary system, the fuel extractor 22 includes the auxiliary fuel pickup 24, with a hollow tube that extends through the elbow fitting 26 to receive fuel from the main fuel tank and provide fuel to an auxiliary system via the auxiliary fuel outlet 27.

In some embodiments, the fuel extractor 22 can be formed, as illustrated, via a drilling and welding operation. For example, a bore can be drilled (or otherwise formed) in the elbow fitting 26, in substantial alignment (e.g., axial alignment) with a main inlet 26a of the elbow fitting 26. A tube for the auxiliary fuel pickup 24 can be inserted through the bore to an appropriate depth, and then welded to the elbow fitting 26 at the bore, in order to provide an appropriate (e.g., hermetic) seal.

Figure 6:
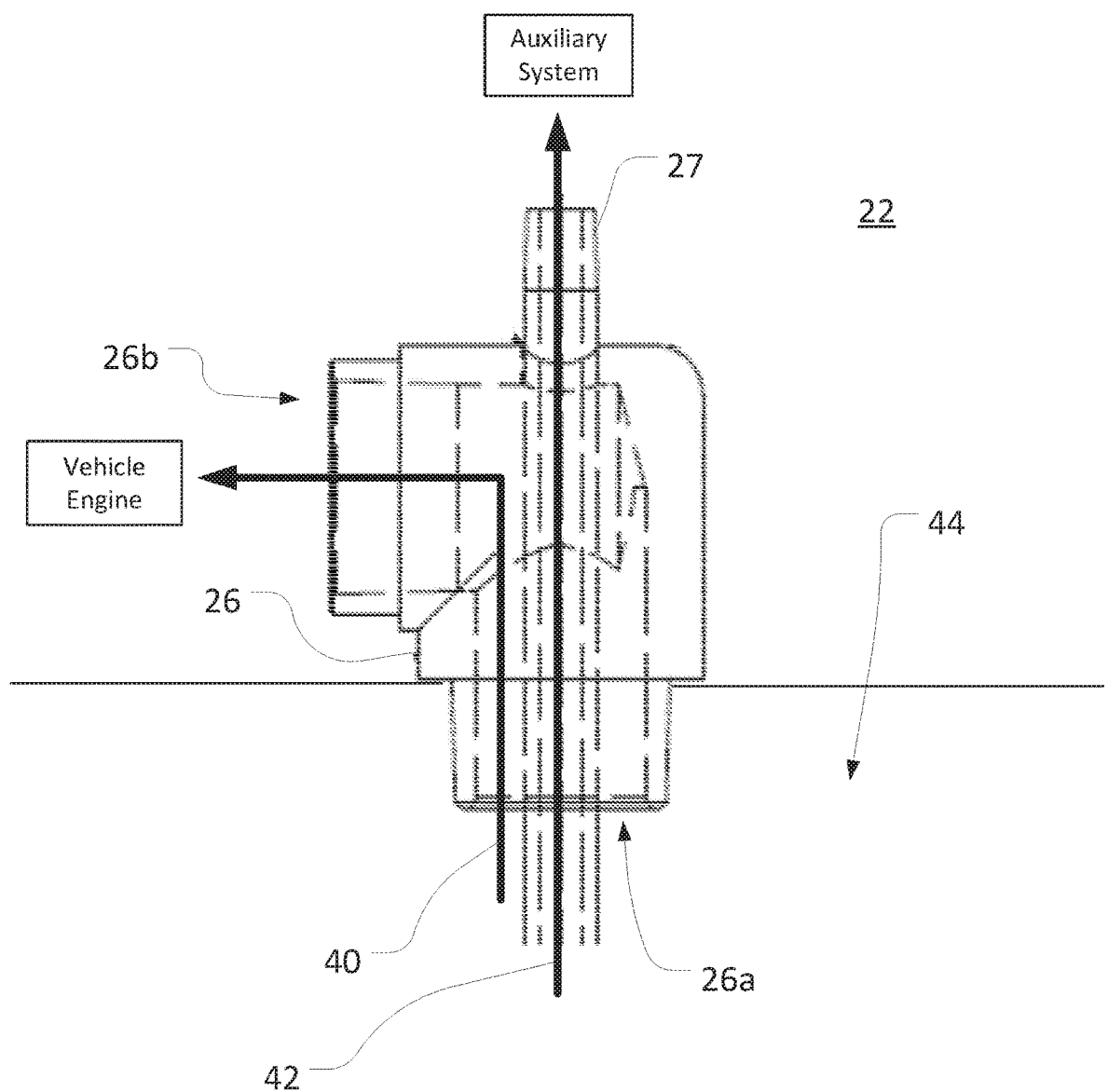
FIG. 6 is an enlarged right side elevation view of the compound fuel extractor of FIG. 3, rendered transparently to illustrate certain internal features, with certain flow paths indicated.

In the illustrated configuration, as also discussed above, the fuel extractor 22 can generally provide two overlapping (e.g., generally or partially coaxial) flow paths for fuel from a fuel tank. As illustrated in FIG. 6, for example, a main flow path 40 can be provided for flow of fuel from a main fuel tank 44 to the main vehicle engine, and an auxiliary flow path 42, contained within but sealed from the main flow path 40, can be provided for flow of fuel from the main fuel tank to an auxiliary location (e.g., an auxiliary engine).

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A fueling system for use with a service vehicle with a fuel tank and a main engine, and an auxiliary system, the fueling system comprising:
a fuel distribution system including at least one fuel pump and at least two fuel nozzles;
a compound fuel extractor configured to engage the fuel tank of the service vehicle to provide first and second overlapping flow paths out of the fuel tank,
the at least two fuel nozzles being in fluid communication with the second overlapping flow path; and
a fuel selector that controls the distribution of fuel to the at least two fuel nozzles;
the first overlapping flow path being configured to direct fuel from the fuel tank to the main engine; and
the second overlapping flow path being configured to direct fuel from the fuel tank to the auxiliary system.

2. The fueling system of claim 1, wherein the compound fuel extractor includes:
a fitting; and
an auxiliary fuel pickup extending through the fitting.

3. The fueling system of claim 2, wherein the fitting includes an inlet and an outlet;
wherein the inlet forms part of the first overlapping flow path; and
wherein the auxiliary fuel pickup extends through the inlet but not through the outlet.

4. The fueling system of claim 3, wherein the second overlapping flow path is contained within the first overlapping flow path.

5. The fueling system of claim 2, wherein the fitting is an elbow fitting.

6. The fueling system of claim 2, wherein the fitting is configured to receive a fusible plug of the service vehicle.

7. A method of retrofitting a service vehicle for use with an auxiliary system, the service vehicle including a main engine separate from the auxiliary system, the method comprising:
removing a fusible plug from a fuel tank of the service vehicle;
securing a compound fuel extractor to the fuel tank, the compound fuel extractor being configured to provide first and second overlapping flow paths out of the fuel tank, the first overlapping flow path directing fuel from the fuel tank to the main engine, and the second overlapping flow path directing fuel from the fuel tank to the auxiliary system; and
securing the fusible plug to the compound fuel extractor along the first overlapping flow path.

8. The method of claim 7, wherein the compound fuel extractor includes:
a fitting; and
an auxiliary fuel pickup extending through the fitting.

9. The method of claim 8, wherein the fitting includes an inlet and an outlet;
wherein the inlet forms part of the first overlapping flow path; and
wherein the auxiliary fuel pickup extends through the inlet but not through the outlet.

10. The method of claim 9, wherein the second overlapping flow path is contained within the first overlapping flow path.

11. The method of claim 8, wherein the fitting is an elbow fitting.

12. A fueling system for use with a service vehicle with a fuel tank and a main engine, and an auxiliary system, the fueling system comprising:
a compound fuel extractor configured to engage the fuel tank of the service vehicle to provide first and second overlapping flow paths out of the fuel tank;
the first overlapping flow path being configured to direct fuel from the fuel tank to the main engine; and
the second overlapping flow path being configured to direct fuel from the fuel tank to the auxiliary system; and
wherein the second overlapping flow path is at least partly contained within the first overlapping flow path.

13. The fueling system of claim 12, wherein the compound fuel extractor includes:
an auxiliary fuel pickup in fluid communication with an auxiliary fuel outlet, the auxiliary fuel pickup forming part of the second overlapping flow path; and
a fitting through which the auxiliary fuel pickup extends, the fitting forming part of the first overlapping flow path.

14. The fueling system of claim 13, wherein the first overlapping flow path within the fitting bends relative to the second overlapping flow path within the fitting.

15. The fueling system of claim 13, wherein the fitting includes an inlet and an outlet;
wherein the inlet forms part of the first overlapping flow path; and
wherein the auxiliary fuel pickup extends through the inlet.

16. The fueling system of claim 13, wherein the fitting is configured to receive a fusible plug of the service vehicle.

17. The fueling system of claim 12, further comprising:
a fuel distribution system including at least one fuel pump and at least one fuel nozzle.

18. The fueling system of claim 17, further comprising:
a control mechanism configured to control operation of the at least one fuel pump.

19. The fueling system of claim 17 further comprising:
at least two fuel nozzles in fluid communication with the second overlapping flow path; and
a fuel selector that controls the distribution of fuel to the at least two fuel nozzles.

20. A fueling system for use with a service vehicle with a fuel tank and a main engine, and an auxiliary system, the fueling system comprising:
a compound fuel extractor configured to engage the fuel tank of the service vehicle to provide first and second overlapping flow paths out of the fuel tank;
the first overlapping flow path being configured to direct fuel from the fuel tank to the main engine; and
the second overlapping flow path being configured to direct fuel from the fuel tank to the auxiliary system;
wherein the compound fuel extractor includes:
an auxiliary fuel pickup in fluid communication with an auxiliary fuel outlet, the auxiliary fuel pickup forming part of the second overlapping flow path; and
a fitting through which the auxiliary fuel pickup extends, the fitting forming part of the first overlapping flow path; and wherein the first overlapping flow path within the fitting bends relative to the second overlapping flow path within the fitting.

21. The fueling system of claim 20, wherein the fitting is configured to receive a fusible plug of the service vehicle.

* * * * *